(12) United States Patent
Pyla et al.

(10) Patent No.: US 12,079,663 B2
(45) Date of Patent: Sep. 3, 2024

(54) PROVISIONING OF PHYSICAL SERVERS THROUGH HARDWARE COMPOSITION

(71) Applicant: Microsoft Technology Licensing, LLC, Redmond, WA (US)

(72) Inventors: Pardha Pyla, Mountain View, CA (US); Srinidhi Varadarajan, Great Falls, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 17/463,210

(22) Filed: Aug. 31, 2021

(65) Prior Publication Data

US 2023/0065444 A1    Mar. 2, 2023

(51) Int. Cl.
*G06F 9/50* (2006.01)
*H04L 43/08* (2022.01)

(52) U.S. Cl.
CPC ............ *G06F 9/505* (2013.01); *G06F 9/5016* (2013.01); *H04L 43/08* (2013.01); *G06F 2209/505* (2013.01)

(58) Field of Classification Search
CPC ........ G06F 9/50; G06F 9/5005; G06F 9/5011; G06F 9/5016; G06F 9/5022; G06F 9/5027; G06F 9/5044; G06F 9/5061; G06F 9/5077
See application file for complete search history.

(56) References Cited

U.S. PATENT DOCUMENTS

| | | |
|---|---|---|
| 9,515,905 B1 * | 12/2016 | Blanding ............ H04L 43/0876 |
| 10,511,324 B1 | 12/2019 | Goyal et al. |
| 10,635,419 B2 | 4/2020 | Yang et al. |
| 10,645,187 B2 | 5/2020 | Goyal et al. |
| 10,656,949 B2 | 5/2020 | Billa et al. |
| 10,727,865 B2 | 7/2020 | Beckman et al. |
| 10,761,931 B2 | 9/2020 | Goyal et al. |

(Continued)

OTHER PUBLICATIONS

Noureddine, "The Fungible DPUTM: A New Category of Microprocessor," Fungible Whitepaper, Retrieved from https://www.fungible.com/wp-content/uploads/2020/08/WP0027.00.02020818-The-Fungible-DPU-A-New-Category-of-Microprocessor.pdf, accessed on Apr. 5, 2021, 8 pp.

(Continued)

*Primary Examiner* — Andy Ho
(74) *Attorney, Agent, or Firm* — Alleman Hall & Tuttle LLP

(57) ABSTRACT

This disclosure describes techniques that include provisioning compute nodes within a data center out of available pools of hardware. In one example, this disclosure describes a method that includes monitoring, by a computing system, a first workload executing on a first compute node, wherein the first compute node includes processing circuitry and first node secondary storage; monitoring, by the computing system, a second workload executing on a second cluster of compute nodes; expanding, by the computing system, the second cluster of compute nodes to include a second compute node that includes second node secondary storage; redeploying the processing circuitry included within the first compute node to the second compute node; and enabling, by the computing system, the second workload to continue executing on the second cluster of compute nodes including the second compute node.

20 Claims, 5 Drawing Sheets

(56) References Cited

U.S. PATENT DOCUMENTS

| | | | |
|---|---|---|---|
| 10,812,630 B2 | 10/2020 | Beckman et al. | |
| 10,827,191 B2 | 11/2020 | Dikshit et al. | |
| 10,827,192 B2 | 11/2020 | Dikshit et al. | |
| 10,848,775 B2 | 11/2020 | Dikshit et al. | |
| 10,862,513 B2 | 12/2020 | Thomas et al. | |
| 10,922,026 B2 | 2/2021 | Billa et al. | |
| 10,929,175 B2 | 2/2021 | Goyal et al. | |
| 10,931,958 B2 | 2/2021 | Dikshit et al. | |
| 10,951,393 B2 | 3/2021 | Thomas et al. | |
| 10,983,721 B2 | 4/2021 | Yang et al. | |
| 10,990,478 B2 | 4/2021 | Goyal et al. | |
| 10,997,123 B2 | 5/2021 | Beckman et al. | |
| 11,003,500 B2 * | 5/2021 | White | G06F 9/505 |
| 11,188,338 B2 | 11/2021 | Nayakam et al. | |
| 11,868,812 B2 * | 1/2024 | Ghergu | G06N 3/0442 |
| 11,924,107 B2 * | 3/2024 | Parla | H04L 47/528 |
| 2020/0159859 A1 | 5/2020 | Beckman et al. | |
| 2020/0162101 A1 | 5/2020 | Beckman et al. | |
| 2020/0169268 A1 | 5/2020 | Billa et al. | |
| 2021/0097047 A1 | 4/2021 | Billa et al. | |
| 2021/0097082 A1 | 4/2021 | Billa et al. | |
| 2021/0097108 A1 | 4/2021 | Goyal et al. | |
| 2023/0153165 A1 * | 5/2023 | Higginson | G06F 11/3442 718/104 |

OTHER PUBLICATIONS

Siman-Tov, "The Case for Disaggregated Storage," Fungible Whitepaper, Retrieved from https://www.fungible.com/wp-content/uploads/2019/09/WP009.00.91020918-The-Case-for-Disaggregated-Storage.pdf, accessed on Apr. 5, 2021, 4 pp.

* cited by examiner

PROVISIONING OF PHYSICAL SERVERS THROUGH HARDWARE COMPOSITION

TECHNICAL FIELD

This disclosure relates to provisioning resources in a data center, including provisioning and/or deploying of servers in a data center.

BACKGROUND

Evolving application architectures have significantly increased the complexity of the modern data center. General purpose applications, including transactional systems, run well on virtualized clusters. On the other hand, containers, artificial intelligence, machine learning, and analytics applications tend to prefer bare metal systems with significant local storage. As a result, data centers sometimes consist of inflexible infrastructure silos. Often, modern data centers have many types of servers: servers without local storage, servers with local storage, servers with graphics processing units (GPUs) and/or accelerator field programmable gate arrays (FPGAs), servers relying on storage area network storage, servers using network attached storage, and others. Because in some cases, it might not be practical to change the hardware configuration of a server after it is procured and deployed, managing such a diverse array of server types and the networks that interconnect them leads to significant operational complexity and cost in data center management and marooned resources and operational inefficiencies.

SUMMARY

This disclosure describes techniques that include provisioning and/or composing of compute nodes within a data center out of available pools of general purpose diskless and NIC-less physical servers and other hardware. Techniques are described for enabling virtualization-like simplicity of management of bare metal servers while preserving security postures across tenants. As described herein, servers may be composed in a dynamic way based on workload demands, thereby enabling efficient utilization of data center resources across workload silos.

In some examples, composition of a new server may be achieved by detaching a physical server from an already-composed node and reattaching the detached physical server to the newly composed server. When detaching the physical server from the former node, the state of the former node (e.g., data, networking configuration, hardware signature) may be preserved, thereby enabling the former node to later be "re-hydrated" for redeployment within the data center.

Techniques described herein may provide certain technical advantages. For instance, by providing the ability to move physical servers among nodes within a data center, both overall utilization of the data center as well as scale-out responsiveness with stateful applications may be improved. Further, techniques described herein may reduce the amount of spare capacity needed to support workload peaks within the data center. Effectively, such workload peaks might be supported using a smaller number of spare physical servers, of fewer types.

In some examples, this disclosure describes operations performed by a computing device or composition engine that acts as a composer within a data center, in accordance with one or more aspects of this disclosure. In one specific example, this disclosure describes a method comprising monitoring, by a computing system, a first workload executing on a first cluster of compute nodes that includes a first compute node, wherein the first compute node includes processing circuitry and first node secondary storage; monitoring, by the computing system, a second workload executing on a second cluster of compute nodes; expanding, by the computing system, the second cluster of compute nodes to include a second compute node that includes second node secondary storage; redeploying the processing circuitry included within the first compute node to the second compute node; and enabling, by the computing system, the second workload to continue executing on the second cluster of compute nodes including the second compute node, and wherein the second compute node processes at least a portion of the second workload using the processing circuitry and the second node secondary storage.

In another example, this disclosure describes a system comprising processing circuitry including a processor and memory (of the physical server), wherein the processing circuitry presents a processing circuitry hardware signature; a peripheral device that is external to the processing circuitry; and a node composition unit configured to: compose a compute node from the processing circuitry and the peripheral device by integrating the peripheral device into the processing circuitry; present an abstraction layer to software executing on the composed compute node so that the peripheral device appears to the software executing on the composed node as a local device interacting with the processing circuitry, wherein presenting the abstraction layer includes presenting to the software executing on the composed compute node a composed hardware signature that is different than the processing circuitry hardware signature.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
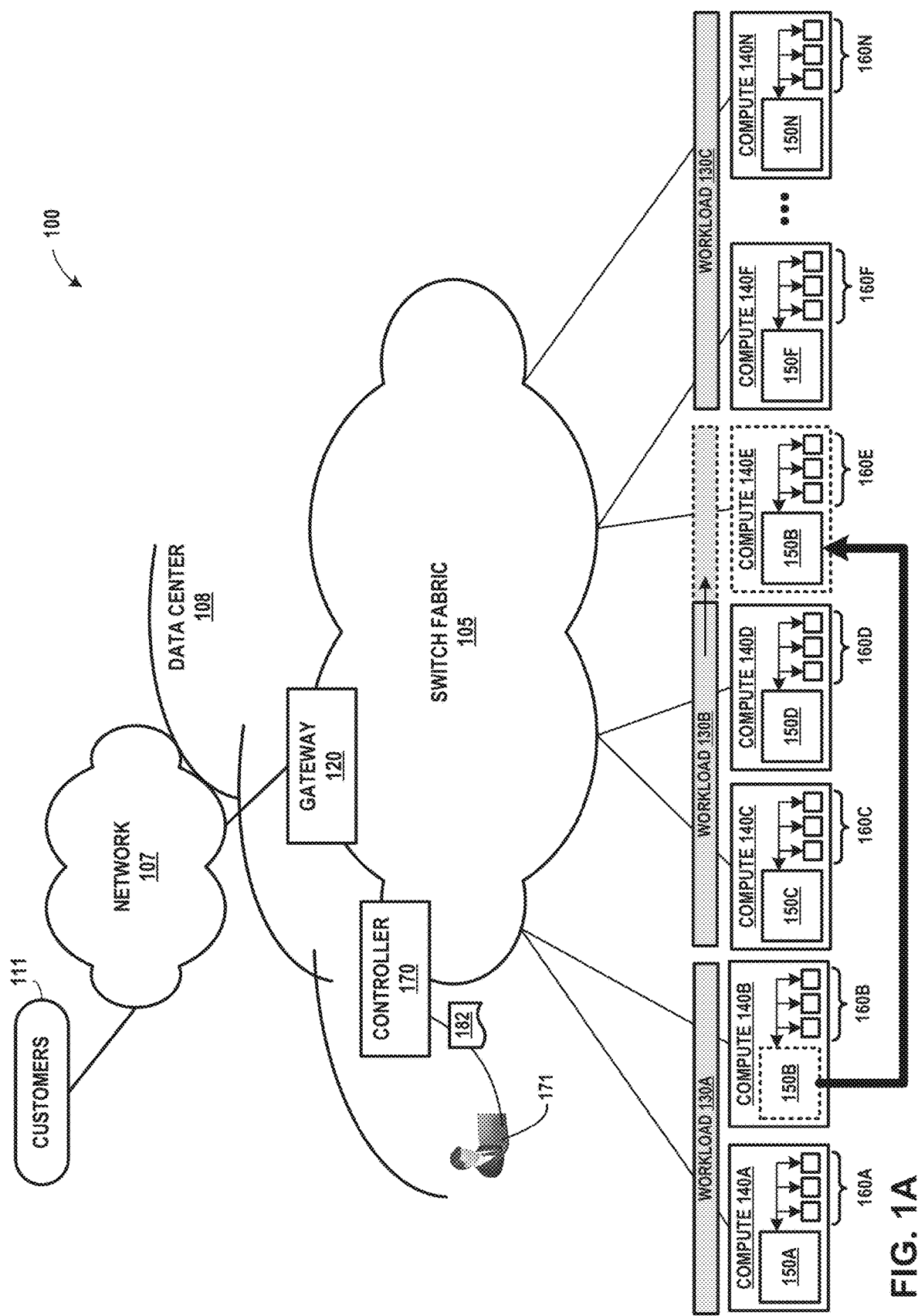
FIG. 1A is a conceptual diagram illustrating a system for provisioning compute nodes or servers in an example data center, in accordance with one or more aspects of the present disclosure.

FIG. 1A is a conceptual diagram illustrating a system for provisioning compute nodes or servers in an example data center, in accordance with one or more aspects of the present disclosure. FIG. 1A illustrates system 100, which includes network 107 and data center 108. Data center 108 provides an operating environment for applications and services executing on computing infrastructure. In general, applications and services execute within data center 108 on behalf of customers 111. Customers 111 may be coupled to data center 108 through network 107 and gateway device 120.

In some examples, network 107 may be an enterprise network or an on-premises network enabling connectivity to data center 108. In other examples, network 107 may be a content provider network and/or a service provider network. Network 107 may be coupled to one or more networks administered by other providers, and may thus form part of a large-scale public network infrastructure, e.g., the Internet. As such, in other examples, network 107 may be a data center wide-area network (DC WAN), a private network, an enterprise LAN or other type of computer network.

Data center 108 may host infrastructure equipment, such as compute nodes, networking and storage systems, redundant power supplies, and environmental controls. Illustrated in FIG. 1A are compute nodes 140A through 140N ("compute nodes 140," representing any number of compute nodes). Each of compute nodes 140 is shown as connected through switch fabric 105. In some examples, some or all of compute nodes 140 may be housed in one or more racks deployed or included within data center 108. Such racks may be interconnected through switch fabric 105 via Ethernet links or via PCIe links. Each of compute nodes 140 may thus be part of data center 108.

In some examples, data center 108 may represent one of many geographically distributed network data centers. Although not specifically illustrated in FIG. 1A, data center 108 may also include various other network equipment, systems, and/or devices, including, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Further, although techniques described herein are often described in the context of a cloud-based or on-premises data center, the techniques described herein may be applied in any form of a computer network.

Controller 170, shown included within data center 108 of FIG. 1A, may be one or more computing devices that manage aspects of how data center 108 is configured and/or operates. In some examples, controller 170 may operate as a high-level controller or may serve as a software-defined networking (SDN) controller that configures and manages the routing and switching infrastructure of data center 108. In such an example, controller 170 may provide a logically (and in some cases physically) centralized controller for facilitating operation of one or more virtual networks within data center 108. Controller 170 may operate on its own, or in response to signals received from administrator device 171 (e.g., where such signals are generated by administrator device 171 in response to input from an administrator operating administrator device 171).

Controller 170 may offer a single-pane-of-glass Web-based management interface along with application programming interface ("API") support for various orchestration and/or management capabilities. Such capabilities may include infrastructure discovery, registration, and initialization, role-based access control, multi-tenancy and resource partitioning, application workload deployment and orchestration, flexible network control, identity management, and hardware lifecycle management and monitoring.

Controller 170 may also configure and manage aspects of how each of workloads 130 are executed. For instance, controller 170 may serve as an orchestration platform for bare metal composition, provisioning, and management within data center 108. In such a role, controller 170 may act as a "composer system," where controller 170 composes instances of compute nodes 140 out of available resources within data center 108. In particular, and as further described herein, controller 170 may compose, create, instantiate, or otherwise configure one or more of compute nodes 140 to enable efficient execution of workloads 130 within data center 108. Controller 170 may, in response to administrator input and/or its own analysis, compose one or more compute nodes 140 from available hardware and deploy such compute nodes 140 to process or execute one or more workloads 130. Controller 170 may enable infrastructure needed within data center 108 to be composed out of pools of resources available within data center 108 (e.g., servers, storage, networks, GPUs, FPGA accelerators). Controller 170 may therefore enable dynamic creation and re-creation of servers based on workload demands, efficient utilization of data center resources across workload silos, and virtualization-like simplicity of management of bare metal servers while preserving security postures across tenants. In doing so, controller 170 may use an "infrastructure as code" approach to ensure repeatability of deployments.

Each of compute nodes 140 illustrated in FIG. 1A may serve as a compute node, meaning that each provides computation facilities for applications executing and data stored within data center 108, typically on behalf of one or more of customers 111. Other nodes within data center 108, not specifically illustrated in FIG. 1A, may primarily be dedicated to other functions. In one such example, data center 108 may include various storage nodes that provide storage facilities for applications and data associated with applications executing within data center 108, again typically on behalf of one or more of customers 111. Such storage nodes may be provided through dedicated hardware-accelerated processing units, where significant input/output operations, encryption, compression, redundancy, snapshots, and hardware provisioning may be hardware accelerated and individually configurable. Generally, nodes of any type may use switch fabric 105 to communicate with other nodes. Switch fabric 105 may be a standard Ethernet fabric that interconnects resources across data center 108, providing Layer 2, Layer 3, and virtual networking functionality within data center 108.

In FIG. 1A, each of compute nodes 140 includes a respective physical compute server 150. For example, compute node 140A includes physical compute server 150A, compute node 140B includes physical compute server 150B, and in general, compute node 140N includes physical compute server 150N. Each of physical compute servers 150A through 150N (collectively "compute servers 150") may simply have a general purpose processor and memory. In general, a compute node or, alternatively, a "composed server," could be in a hydrated state or de-hydrated state, as described herein. Often, each of compute servers 150 (or "physical servers") may be an x86-based server, although any or all of compute servers 150 may be based on other architectures. In some examples, including the example of FIG. 1A, each of compute servers 150 is configured without any disk or solid state disk ("SSD") storage and without any network interface card ("NIC"). Compute nodes 140 are, however, illustrated as including peripheral devices 160A through 160N (collectively "peripheral devices 160"). Each respective set of peripheral devices 160 may include disk or SSD storage devices, one or more network interfaces (e.g., NICs), one or more graphical processing units ("GPUs"), and/or one or more field programmable gate arrays ("FPGAs"). As illustrated, a set of peripheral devices 160 may be considered to be included within each respective compute node 140, but such peripheral devices 160 are, in the example shown, external to the physical compute server 150 included in each respective compute node 140. A "workload" may include the operating system and application running on a compute node.

Groups or clusters of compute nodes 140 may be deployed or tasked to support operations of various applications or workloads, including, as illustrated in FIG. 1A, workloads 130A, 130B, and 130C (collectively "workloads 130"). Although each of workloads 130 may execute on a single compute node 140, each of workloads 130 may often execute on multiple compute nodes. For example, workload 130A is shown in FIG. 1A positioned above compute nodes 140A and 140B, which is intended to indicate that workload 130A is an application, service, or other workload that executes on the underlying hardware of a cluster of computing devices consisting of compute node 140A and compute node 140B. Similarly, workload 130B is illustrated to indicate that it executes on compute nodes 140C and 140D. Workload 130C also executes on a cluster of compute nodes: compute nodes 140F through 140N. Workloads 130 may be deployed across multiple compute nodes 140 for various reasons, including to achieve favorable performance, to enable scalability, to accommodate differing resources that might be required by diverse sets of tenants or users, or for other reasons. For ease of illustration, each of workloads 130 is shown executing on a small number of compute nodes 140, but in actual implementations, many compute nodes 140 may support a given workload 130. Similarly, also for ease of illustration, only a small number of workloads 130 are illustrated in FIG. 1A, but data center 108 may support any number of workloads 130.

In some examples, data center 108 may be an enterprise data center, where the number of available compute nodes 140 (or the number of physical compute servers 150) tends to be relatively small compared to the needs of workloads 130. In other words, in some enterprise or on-premises data centers, only a relatively small number of bare metal compute servers 150 might be available to support various workloads 130. Often, such workloads 130 may consume all available processing capabilities (e.g., all available compute servers 150). In such an example, few compute servers 150 will be idle or unused at any given time, and efficient processing of workloads 130 might depend on how effectively the available computing resources within compute nodes 140 can be allocated to and/or deployed across workloads 130. In some cases, the efficiency of workload processing might be improved by reallocating computing resources from overserved workloads to workloads that are underserved.

Figure 1B:
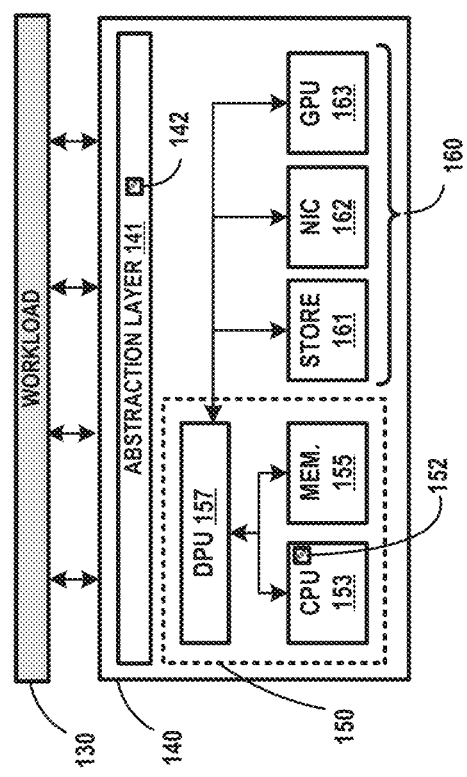
FIG. 1B is a block diagram illustrating an example compute node in greater detail, in accordance with one or more aspects of the present disclosure.

FIG. 1B is a block diagram illustrating an example compute node in greater detail, in accordance with one or more aspects of the present disclosure. Compute node 140 of FIG. 1B may be considered an example of one or more of compute nodes 140 of FIG. 1A, and one or more aspects of compute node 140 of FIG. 1B may be described in the context of FIG. 1A. Compute node 140 includes compute server 150 interconnected with storage device 161, NIC 162, and GPU 163. Compute server 150 corresponds to any of compute servers 150A through 150N illustrated in FIG. 1A, and includes one or more processors 153, one or more memory devices 155, and one or more data processing units, or DPU 157. Storage device 161, NIC 162, and GPU 163 in FIG. 1B are examples of devices that may be included within peripheral devices 160A through 160N of FIG. 1A. An example workload 130 is shown in FIG. 1B interacting with and executing on compute node 140.

In the example of FIG. 1B, compute server 150 might be implemented as a bare metal server without any disks, without any NICs, and without any GPUs. Each of storage device 161, NIC 162, and GPU 163 are interconnected with compute server 150 through DPU 157, and may provide storage, networking capability, and GPU processing capability to the otherwise diskless and NIC-less compute server 150. Accordingly, compute server 150, along with peripheral device 160 may provide a full functioning compute node 140 having processing capabilities (primarily provided through compute server 150), as well as storage capabilities (e.g., storage device 161), networking capabilities (e.g., NIC 162), and additional processing capabilities (e.g., GPU 163). In addition, although not shown, one or more other peripheral devices 160 may provide compute node 140 with additional or other capabilities (e.g. FPGAs).

DPU 157 may be a programmable chip, card, and/or hardware device that enables other external devices to appear to be physically included within compute server 150. In some examples, DPU 157 is integrated within compute server 150 in a sufficiently low-level way that various external devices appear—to applications executing on compute server 150, or in some cases even to processor 153—to be hardware devices included within compute server 150. In the example of FIG. 1B, DPU 157 is configured within compute server 150 such that even to low level software (e.g., operating system or kernel code), storage device 161, NIC 162, and GPU 163 appear to be physically included within compute server 150. DPU 157 effectively builds, directly in hardware, storage device 161, NIC 162, and GPU 163 as devices that are included within compute server 150. As a result, DPU 157 enables one or more storage devices 161, one or more NICs 162, and one or more GPUs 163 to be created and/or instantiated at a hardware level within compute server 150. Notably, such devices can appear to be included within compute server 150 without resorting to virtualization.

In addition, DPU 157 integrates within compute node 140 and compute server 150 to provide abstraction layer 141. Abstraction layer 141 may represent the view of compute node 140 from the perspective of workloads 130 that execute on compute node 140. For example, if workload 130 executes on compute node 140, compute node 140 appears as presented by abstraction layer 141, and not as a device that is composed of a specific processor 153, a specific memory device 155, and specific external peripheral devices 160. Normally, a device that might be composed of a processor, memory and storage devices, and various peripheral devices will present (e.g., to application software) a hardware signature or hardware identifier. Often, such a hardware signature or hardware identifier is associated with processor 153 (see, e.g., bare metal hardware signature 152 illustrated in FIG. 1B). However, if DPU 157 configures compute node 140 to present abstraction layer 141, workload 130 sees compute node 140 as abstraction layer 141, rather than a device that presents a bare metal processor and/or collection of hardware that can be identified by bare metal hardware signature 152. Abstraction layer 141 may therefore provide any appropriate view of the underlying hardware, and may provide a different hardware signature (e.g., node hardware signature 142) than the bare metal hardware signature 152 associated with processor 153.

Accordingly, abstraction layer 141 reduces or eliminates the tight coupling between processor 153 and applications that execute on processor 153 (e.g., workload 130). Even low-level software, such as an operating system or kernel software that might execute with or in support of workload 130, would see compute node 140 through abstraction layer 141. Therefore, such low-level software would see compute node 140 as being identified by node signature 142, rather than by bare metal hardware signature 152. In some cases, node signature 142 may also encompass and/or represent hardware signatures of other devices included within compute node 140, such as storage disks or network interface cards. In such an example, node signature 142 may include multiple signatures, each corresponding to a different device included within compute node 140. And for each such signature, the signature may be defined by the abstraction layer 141, rather than by the actual hardware signature of the underlying device. This arrangement enables (physical) compute server 150 to be removed and/or replaced with a different compute server 150, while preserving other aspects of compute node 140 (e.g., storage devices 161, NICs 162, and/or GPUs 163). Accordingly, removal of compute server 150 can be performed while preserving the state of compute node 140, including the data stored on storage devices 161, the networks to which NICs 162 are connected, the IP address and MAC addresses used, and/or any state or data associated with processing being performed by peripherals 160 (e.g., GPUs or FPGAs 163.) The state can later be "re-hydrated" by attaching the same or a different compute server 150 that meets the computing specification of the original compute server 150. As described herein, controller 170 may employ such a technique to improve scale-out responsiveness with stateful applications and improve overall data center utilization. In some respects, such a process might be referred to as "thin provisioning" for servers, providing significant flexibility to controller 170 and/or administrators to adjust the set of resources allocated to various workloads 130 executing within data center 108.

Techniques described herein may address other technical and even administrative issues. For example, in some cases, workloads 130 that might execute on compute node 140 may normally inspect the underlying hardware of compute node 140 for licensing, security, or other purposes. Such inspections are often performed to ensure that the underlying hardware on which workload 130 is executing has not changed. If compute node 140 presents abstraction layer 141 including node signature 142, however, a change or replacement of physical compute server 150 might not be apparent to workload 130 or to any operating system executing on compute node 140. As a result, a node configured as illustrated in FIG. 1B may enable changes to be made to the underlying hardware of compute node 140 (i.e., compute server 150) in a way that is transparent to workload 130 and/or transparent to any kernel code or operating system on which workload 130 might execute. In other words, if physical compute server 150 in compute node 140 is replaced with a different physical compute server, such a change to compute node 140 might not be detected by code executing on compute node 140 as part of workload 130. Accordingly, modifications to compute server 150 might not raise licensing, security, or other issues that might ordinarily be triggered by a change to the bare metal hardware signature 152 that was used by the original processor 153 within the original compute server 150.

In accordance with one or more aspects of the present disclosure, controller 170 may receive information about resources needed to execute workloads 130. For instance, in an example that can be described in the context of FIG. 1A, controller 170 detects a signal from administrator device 171 (e.g., generated in response to input by an administrator operating device 171). Controller 170 determines that the signal corresponds to specifications about the compute or server needs of various workloads 130, including workloads 130A, 130B, and 130C. Controller 170 further determines that the specifications describe the geometry of compute nodes that may be needed to execute workloads 130. In some examples, the specifications may take the form of a composition profile (e.g., one or more composition profiles 182) for each of workloads 130. Such composition profiles 182 may include compute, storage, and network specifications. Compute specifications may include a description of the type of general purpose diskless and NIC-less compute server to be used by each of workloads 130 (e.g., an x86 processor with 16 cores, 64 GB memory), and a specific model of computer (e.g., Dell, Hewlett Packard, etc.). Storage specifications may include a definition of a set of disks, including capacity, quality of service parameters, desired storage services, and potentially a disk image to lay out each disk. Network specifications may include a definition of a set of NICs and the network each provisioned compute node 140 should join. In some cases, composition profile 182 may include other specifications, including, for example, whether a cloud-init first boot configuration is to be implemented.

Controller 170 may provision resources for workloads 130. For instance, continuing with the example being described in the context of FIG. 1A, controller 170 provisions, based on composition profile 182, one or more compute nodes 140. Specifically, controller 170 provisions compute node 140A and compute node 140B for workload 130A. Controller 170 also provisions compute node 140C and compute node 140D for workload 130B. And controller 170 provisions compute nodes 140F through 140N for workload 130C.

Each provisioned compute node 140 includes a respective physical compute server 150 and a set of peripheral devices 160. In the example of FIG. 1A, compute node 140A includes physical compute server 150A and peripheral devices 160A, compute node 140B includes physical compute server 150B and peripheral devices 160B, and in general, compute node 140N includes physical compute server 150N and peripheral devices 160N. Each of compute nodes 140 may be configured as illustrated in FIG. 1B, so that, for example, physical compute server 150A of compute node 140 includes a corresponding processor 153A, memory device 155A, and DPU 157A. Each of compute servers 150B through 150N may also be configured as illustrated in FIG. 1B, so that in general, a given physical compute server 150N includes a corresponding processor 153N, memory device 155N, and DPU 157N.

Controller 170 may configure each of workloads 130 to execute on a specific set of compute nodes 140. For instance, continuing with the example being described in the context of FIG. 1A, controller 170 configures and/or enables workload 130A to execute on compute nodes 140A and 140B. Similarly, controller 170 configures workload 130B to execute on compute nodes 140C and 140D, and configures workload 130C to execute on compute nodes 140F through 140N.

Controller 170 may monitor execution of workloads 130. For instance, still referring to the example being described in the context of FIG. 1A, controller 170 monitors, queries, or otherwise receives information about utilization, performance, and/or other metrics associated with various workloads 130 executing within data center 108. In particular, controller 170 receives information about processor utilization of workload 130B, and determines that each of compute servers 150C and compute server 150D are highly utilized. Controller 170 further receives information about processor utilization of workload 130A and determines that compute servers 150A and 105B have relatively low utilization.

Controller 170 may increase the number of compute nodes 140 supporting workload 130B. For instance, again with reference to FIG. 1A, controller 170 determines that workload 130B would benefit from additional processing resources, and that workload 130A could operate effectively with less processing resources. Controller 170 increases the size of the cluster of compute nodes 140 (i.e., compute nodes 140C and 140D) supporting workload 130B by composing compute node 140E. In the example being described, compute node 140E is a new compute node to be used for processing workload 130B. Controller 170 also decreases or causes the cluster of compute nodes 140 processing workload 130A to be decreased by one compute node. In the example of FIG. 1A, controller 170 chooses to wind down compute node 140B, and as a result of decreasing the size of the cluster supporting workload 130A, compute node 140B becomes idle.

Controller 170 may reallocate compute server 150B to workload 130B. For instance, still with reference to FIG. 1A, controller 170 detaches compute server 150B from compute node 140B. In some examples, such a detachment may be referred to as a "dehydrating" of compute node 140B executing workload 130A. Controller 170 thereafter redeploys compute server 150B to newly created compute node 140E, which might be referred to as "hydrating" the new compute node 140E. Compute node 140E thereafter begins processing workload 130B along with compute nodes 140C and 140D, so that workload 130B now executes on compute nodes 140C, 140D, and 140E. Note that in the example described, workload 130A may continue processing on compute node 140A, and that the overall number of bare metal compute servers 150 processing workloads within data center 108 remains constant.

In the example described, a physical server, compute server 150B, is dynamically detached from a composed instance of an idling workload (i.e., compute node 140B), and is reattached to a composed instance of an at-load application (i.e., compute node 140E). Such a process may improve overall utilization of data center 108 by reducing the amount of spare capacity needed to support workload peaks within data center 108 across different times. In the example described, a small number of spare servers, of fewer types, may be used to support workload peaks across data center 108. In some examples, the process of "dehydrating" idle compute nodes 140 and "hydrating" new compute nodes 140 (or "rehydrating" standby compute nodes 140) of at-load workloads 130 may be automated using heuristics. In such an example, data center 108 may serve as a dynamic data center operating system that does dynamic resource scheduling and management.

Techniques described herein for such thin provisioning of servers are primarily described in the context of moving, deploying, and/or reallocating compute servers 150 among compute nodes 140 within data center 108. However, in other examples, it may be possible to employ similar techniques to move, deploy, and/or reallocate processors 153 among compute nodes 140 within data center 108.

In some examples, DPU 157 may be implemented as an expansion card configured to interoperate with compute server 150 through a PCIe bus within compute server 150 (e.g., through a motherboard expansion slot). In other examples, DPU 157 may be implemented in other ways to enable various external devices (e.g., storage device 161, MC 162, and/or GPU 163, as well as others) to appear as hardware devices included within compute server 150. For instance, DPU 157 may be configured to interact with processor 153 through other busses or in other ways, DPU 157 may be integrated into a motherboard hosting processor 153, or some or all of aspects of DPU 157 might be included within processor 153 itself. Other implementations are possible.

Further, DPU 157 may be capable of performing other functions, including those relating to performing data centric tasks within data center 108. For example, DPU 157 may be a dedicated hardware-accelerated processing unit (as alluded to above) that is optimized to support operations in a compute node deployed as a storage node. Alternatively, or in addition, DPU 157 may perform tasks for processing streams of data units, such as storage and retrieval of data to and from storage devices (such as SSDs), networking tasks and the like. DPU 157 may also be configured to support one or more host interfaces, including those based on PCI-e ports. DPU 157 may also support other high-speed network interfaces, such as Ethernet ports, and may do so without the need for a separate network interface card (NIC). DPU 157 may include programmable hardware specialized for network traffic. In some examples, DPU 157 may be programmable such that it exposes hardware primitives for selecting and programmatically configuring data processing operations; DPU 157 may be optimized for these processing tasks as well. For example, DPU 157 may include hardware implementations of high-performance data processing tasks, such as cryptography, compression (and decompression), regular expression processing, lookup engines, or the like.

In general, DPU 157 may be implemented in the manner described in other applications listed herein. DPU 157, as depicted in FIG. 1B and elsewhere herein, may be implemented to include some or all aspects of operations described in such other applications, and may be implemented in the manner described in such other applications. In particular, further details of various potential implementations of DPU 157 can be found in U.S. patent application Ser. No. 16/035,416 filed Jul. 13, 2018, entitled "ARC CACHING FOR DETERMINISTIC FINITE AUTOMATA OF REGULAR EXPRESSION ACCELERATOR," U.S. patent application Ser. No. 16/035,478 filed Jul. 13, 2018, entitled "INSTRUCTION-BASED NON-DETERMINISTIC FINITE STATE AUTOMATA ACCELERATOR," U.S. patent application Ser. No. 16/035,457 filed Jul. 13, 2018, entitled "DETERMINISTIC FINITE AUTOMATA NODE CONSTRUCTION AND MEMORY MAPPING FOR REGULAR EXPRESSION ACCELERATOR," U.S. patent application Ser. No. 16/035,444 filed Jul. 13, 2018, entitled "INCREMENTAL COMPILATION OF FINITE AUTOMATA FOR A REGULAR EXPRESSION ACCELERATOR," U.S. patent application Ser. No. 16/157,265 filed Oct. 11, 2018, entitled "MULTIMODE CRYPTOGRAPHIC PROCESSOR," U.S. patent application Ser. No. 16/169,736 filed Oct. 24, 2018, entitled "INLINE RELIABILITY CODING FOR STORAGE ON A NETWORK," U.S. patent application Ser. No. 16/178,341 filed Nov. 1, 2018, entitled "DATA PROCESSING UNIT HAVING HARDWARE-BASED RANGE ENCODING AND DECODING," U.S. patent application Ser. No. 16/178,373 filed Nov. 1, 2018, entitled "DATA PROCESSING UNIT HAVING HARDWARE-BASED RANGE ENCODING AND DECODING," U.S. patent application Ser. No. 16/179,496 filed Nov. 2, 2018, entitled "MEMORY LAYOUT FOR JPEG ACCELERATOR," U.S. patent application Ser. No. 16/179,529 filed Nov. 2, 2018, entitled "WORK ALLOCATION FOR JPEG ACCELERATOR," U.S. patent application Ser. No. 16/179,558 filed Nov. 2, 2018, entitled "JPEG ACCELERATOR USING LAST-NON-ZERO (LNZ) SYNTAX ELEMENT," U.S. patent application Ser. No. 16/179,472 filed Nov. 2, 2018, entitled "PARALLEL CODING OF SYNTAX ELEMENTS FOR JPEG ACCELERATOR," U.S. patent application Ser. No. 16/195,209 filed Nov. 19, 2018, entitled "HISTORY-BASED COMPRESSION PIPELINE FOR DATA COMPRESSION ACCELERATOR OF A DATA PROCESSING UNIT," U.S. patent application Ser. No. 16/195,290 filed Nov. 19, 2018, entitled "HASHING TECHNIQUES IN DATA COMPRESSION ACCELERATOR OF A DATA PROCESSING UNIT," U.S. patent application Ser. No. 16/195,564 filed Nov. 19, 2018, entitled "MATCHING TECHNIQUES IN DATA COMPRESSION ACCELERATOR OF A DATA PROCESSING UNIT," U.S. patent application Ser. No. 16/195,644 filed Nov. 19, 2018, entitled "MERGING TECHNIQUES IN DATA COMPRESSION ACCELERATOR OF A DATA PROCESSING UNIT," U.S. patent application Ser. No. 16/195,617 filed Nov. 19, 2018, entitled "DATA STRIPING FOR MATCHING TECHNIQUES IN DATA COMPRESSION ACCELERATOR OF A DATA PROCESSING UNIT," U.S. patent application Ser. No. 16/198,607 filed Nov. 21, 2018, entitled "SERVICE CHAINING HARDWARE ACCELERATORS WITHIN A DATA STREAM PROCESSING INTEGRATED CIRCUIT," U.S. patent application Ser. No. 16/200,484 filed Nov. 26, 2018, entitled "STATIC DICTIONARY-BASED COMPRESSION HARDWARE PIPELINE FOR DATA COMPRESSION ACCELERATOR OF A DATA PROCESSING UNIT," U.S. patent application Ser. No. 16/249,658 filed Jan. 16, 2019, entitled "DATA PROCESSING UNIT HAVING HARDWARE-BASED PARALLEL VARIABLE-LENGTH CODEWORD DECODING," U.S. patent application Ser. No. 16/265,606 filed Feb. 1, 2019, entitled "FLEXIBLE RELIABILITY CODING FOR STORAGE ON A NETWORK," U.S. patent application Ser. No. 16/440,689 filed Jun. 13, 2019, entitled "CONTEXT VALUE RETRIEVAL PRIOR TO OR PARALLEL WITH EXPANSION OF PREVIOUS SYMBOL FOR CONTEXT-DECODING IN RANGE DECODER," U.S. patent application Ser. No. 16/584,293 filed Sep. 26, 2019, entitled "DATA FLOW GRAPH-DRIVEN ANALYTICS PLATFORM USING DATA PROCESSING UNITS HAVING HARDWARE ACCELERATORS," U.S. patent application Ser. No. 16/584,390 filed Sep. 26, 2019, entitled "DATA INGESTION AND STORAGE BY DATA PROCESSING UNIT HAVING STREAM-PROCESSING HARDWARE ACCELERATORS," and U.S. patent application Ser. No. 16/584,467 filed Sep. 26, 2019, entitled "QUERY PROCESSING USING DATA PROCESSING UNITS HAVING DFA/NFA HARDWARE ACCELERATORS." The entire contents of all of these applications are hereby incorporated by reference.

Figure 2:
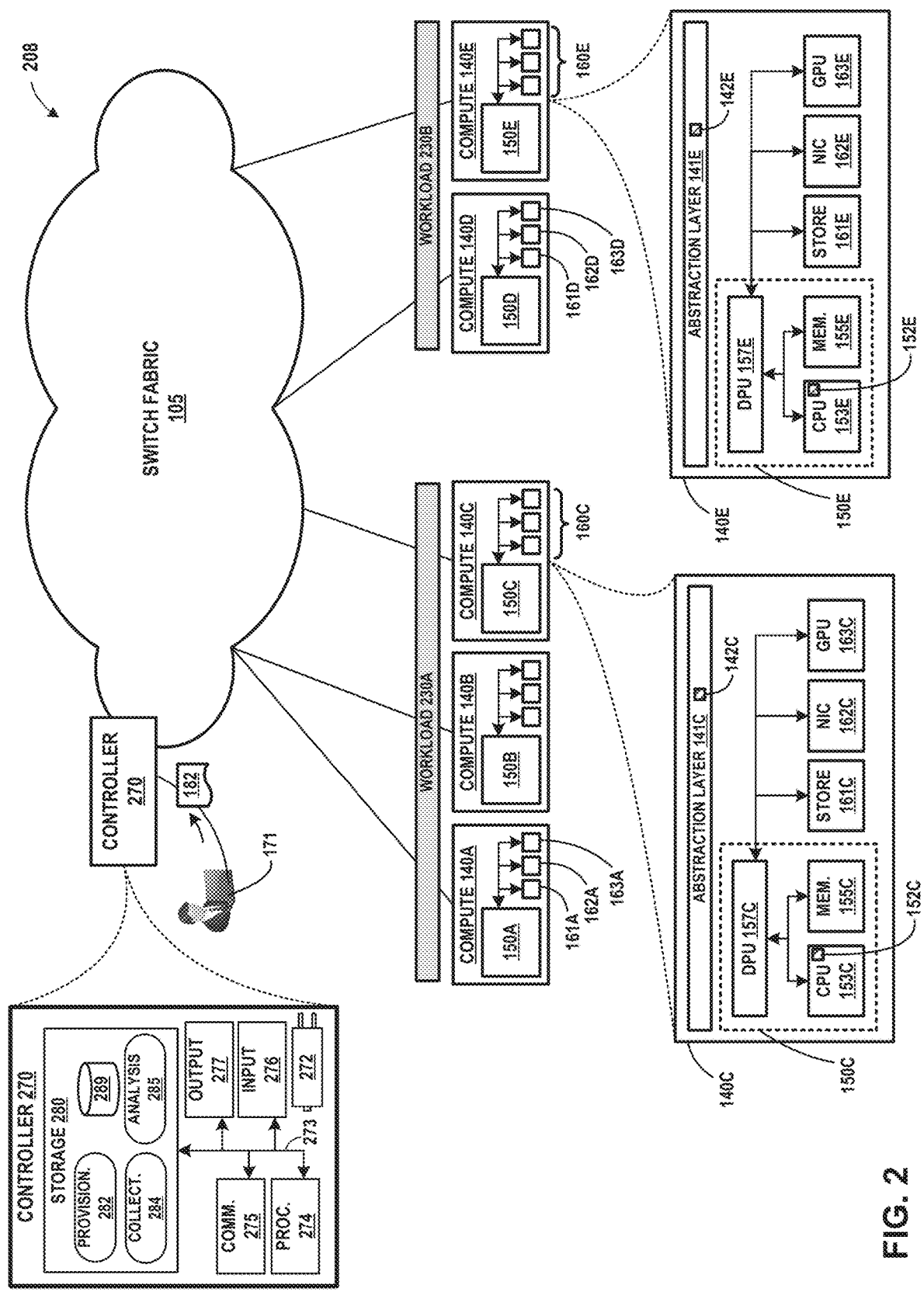
FIG. 2 is a block diagram illustrating an example data center in which compute nodes are provisioned, in accordance with one or more aspects of the present disclosure.

FIG. 2 is a block diagram illustrating an example data center in which compute nodes are provisioned, in accordance with one or more aspects of the present disclosure. Data center 208, illustrated in FIG. 2, may be described as an example or alternative implementation of data center 108 of FIG. 1A. Data center 208 includes many of the same elements described in connection with FIG. 1A and FIG. 1B. For instance, various compute nodes 140 illustrated in FIG. 2 may be considered examples of compute node 140 of FIG. 1B or any of compute nodes 140 of FIG. 1A. Accordingly, one or more aspects of FIG. 2 may be described herein within the context of FIG. 1A and FIG. 1B.

In the example of FIG. 2, data center 208 includes switch fabric 105, controller 270, and compute nodes 140A through 140E (collectively "compute nodes 140"). Workload 230A and workload 230B are shown executing on compute nodes 140A through 140C and compute nodes 140D and 140E, respectively. Relatively detailed illustrations of compute node 140C and compute node 140E are included in FIG. 2. These illustrations of compute nodes 140C and 140E are similar to the illustration of compute node 140 shown in FIG. 1B. For example, as shown in FIG. 2, compute server 150C of compute node 140C includes one or more processors 153C, one or more memory devices 155C, and one or more DPUs 157C. Peripheral devices 160C include one or more storage devices 161C, one or more NICs 162C, and may include one or more GPUs 163C. As in FIG. 1B, DPU 157C configures each of peripheral devices 160C so that each appears to be a hardware device internal to compute server 150C. DPU 157C also presents abstraction layer 141C to any workloads that might execute on compute node 140C. Similarly, compute server 150E of compute node 140E includes one or more processors 153E, one or more memory devices 155E, and one or more DPUs 157E. Peripheral devices 160E include one or more storage devices 161E, one or more NICs 162E, and may include one or more GPUs 163E. As in other examples, each of peripheral devices 160E are configured to appear as a hardware device within compute server 150E. DPU 157E presents abstraction layer 141E to any workloads that execute on compute node 140E.

Each of the other compute nodes 140 shown in FIG. 2 are connected by switch fabric 105 and may be implemented in a manner similar to the illustrated compute nodes 140C and 140E. Similar illustrations could be provided for such other compute nodes 140. For ease of illustration, however, only detailed illustrations for compute node 140C and 140E are presented in FIG. 2.

In the example of FIG. 2, a representation of workload 230A is illustrated above three compute nodes 140, indicating that workload 230A is executing on compute nodes 140A through 140C. Similarly, a representation of workload 230B is shown above compute node 140D and compute node 140E, indicating that workload 230B executes on those two compute nodes.

In FIG. 2, controller 270 may correspond to controller 170 of FIG. 1A, and may serve as a composer for composing instances of compute nodes 140. Controller 270 may perform other functions, including those pertaining to managing data center 108, as described in connection with controller 170 of FIG. 1A. Controller 270 may thus be considered an example implementation of controller 170 of FIG. 1A.

In some examples, controller 270 represents one or more physical computing devices or compute nodes that provide an execution environment for tasks relating to management of data center 108 and/or relating to composition, reallocation, and/or tuning of compute nodes 140 and the workloads 230 that compute nodes 140 support. Controller 270 may be a physical, on-premises computing device or collection of computing devices. In other examples, controller 270 may be a component of a cloud computing system, server farm, and/or server cluster (or portion thereof) that provides services to client devices and other devices or systems.

Although primarily described herein as a physical computing device located on-premises within data center 108, controller 270 may in other examples, be implemented remotely and/or as a virtualized computing device (e.g., as a virtual machine or container).

In the example of FIG. 2, physical computing device or compute node 270 is illustrated with underlying physical compute hardware that includes power source 272, one or more processors 274, one or more communication units 275, one or more input devices 276, one or more output devices 277, and one or more storage devices 280. One or more of the devices, modules, storage areas, or other components of physical computing device or compute node 270 may be interconnected to enable inter-component communications (physically, communicatively, and/or operatively). In some examples, such connectivity may be provided by through communication channels (e.g., communication channels 273), a system bus, a network connection, an inter-process communication data structure, or any other method for communicating data.

Power source 272 may provide power to one or more components of controller 270. Power source 272 may receive power from the primary alternating current (AC) power supply in a building, home, or other location. In other examples, power source 272 may be a battery or a device that supplies direct current (DC). In still further examples, controller 270 and/or power source 272 may receive power from another source. One or more of the devices or components illustrated within controller 270 may be connected to power source 272, and/or may receive power from power source 272. Power source 272 may have intelligent power management or consumption capabilities, and such features may be controlled, accessed, or adjusted by one or more modules of controller 270 and/or by one or more processors 274 to intelligently consume, allocate, supply, or otherwise manage power.

One or more processors 274 of controller 270 may implement functionality and/or execute instructions associated with controller 270 or associated with one or more modules illustrated herein and/or described below. One or more processors 274 may be, may be part of, and/or may include processing circuitry that performs operations in accordance with one or more aspects of the present disclosure. Examples of processors 274 include microprocessors, application processors, display controllers, auxiliary processors, one or more sensor hubs, and any other hardware configured to function as a processor, a processing unit, or a processing device. Controller 270 may use one or more processors 274 to perform operations in accordance with one or more aspects of the present disclosure using software, hardware, firmware, or a mixture of hardware, software, and firmware residing in and/or executing at controller 270.

One or more communication units 275 of controller 270 may communicate with devices external to controller 270 by transmitting and/or receiving data, and may operate, in some respects, as both an input device and an output device. In some examples, communication unit 275 may communicate with other devices over a network. In other examples, communication units 275 may send and/or receive radio signals on a radio network such as a cellular radio network. In other examples, communication units 275 of controller 270 may transmit and/or receive satellite signals on a satellite network such as a Global Positioning System (GPS) network. Examples of communication units 275 include a network interface card (e.g. such as an Ethernet card), an optical transceiver, a radio frequency transceiver, a GPS receiver, or any other type of device that can send and/or receive information. Other examples of communication units 275 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 276 may represent any input devices of controller 270 not otherwise separately described herein. One or more input devices 276 may generate, receive, and/or process input from any type of device capable of detecting input from a human or machine. For example, one or more input devices 276 may generate, receive, and/or process input in the form of electrical, physical, audio, image, and/or visual input (e.g., peripheral device, keyboard, microphone, camera).

One or more output devices 277 may represent any output devices of controllers 270 not otherwise separately described herein. One or more output devices 277 may generate, receive, and/or process output from any type of device capable of outputting information to a human or machine. For example, one or more output devices 277 may generate, receive, and/or process output in the form of electrical and/or physical output (e.g., peripheral device, actuator).

One or more storage devices 280 within controller 270 may store information for processing during operation of controller 270. Storage devices 280 may store program instructions and/or data associated with one or more of the modules described in accordance with one or more aspects of this disclosure. One or more processors 274 and one or more storage devices 280 may provide an operating environment or platform for such modules, which may be implemented as software, but may in some examples include any combination of hardware, firmware, and software. One or more processors 274 may execute instructions and one or more storage devices 280 may store instructions and/or data of one or more modules. The combination of processors 274 and storage devices 280 may retrieve, store, and/or execute the instructions and/or data of one or more applications, modules, or software. Processors 274 and/or storage devices 280 may also be operably coupled to one or more other software and/or hardware components, including, but not limited to, one or more of the components of controller 270 and/or one or more devices or systems illustrated as being connected to controller 270.

In some examples, one or more storage devices 280 are temporary memories, which may mean that a primary purpose of the one or more storage devices is not long-term storage. Storage devices 280 of controller 270 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 280, in some examples, also include one or more computer-readable storage media. Storage devices 280 may be configured to store larger amounts of information than volatile memory. Storage devices 280 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Provisioning module 282 may perform functions relating to composing and/or provisioning one or more compute nodes 140 to handle or support processing of one or more workloads 230. Provisioning module 282 may cause controller 270 to compose one or more compute nodes 140 based on one or more composition profiles 182, where such composition profiles 182 are derived from administrator input (e.g., from administrator device 171) or generated in response to data produced by analysis module 285. In some examples, provisioning module 282 may cause controller 270 to compose a compute node 140 by detaching a physical compute server 150 from another compute node 140 (e.g., an idle or other hydrated compute node 140) and inserting the detached compute server 150 into the new compute node 140. In other examples, provisioning module 282 may cause controller 270 to rehydrate a previously-created compute node 140 by detaching a compute server 150 from another compute node 140 (e.g., an idle or other hydrated compute node 140) and rehydrating an existing compute node 140 with the detached compute server 150.

Collection module 284 may perform functions relating to collecting data about workloads or other operations executing on one or more compute nodes 140. For instance, collection module 284 may collect data indicating utilization rates of resources of each of compute nodes 140, including CPU utilization, memory utilization, storage utilization, networking statistics, and utilization rates of any GPU (e.g., GPUs 163) that may be included within a given compute node 140. Collection module 284 may cause controller 270 to poll one or more compute nodes 140 for such data. Alternatively, or in addition, collection module 284 may cause controller 270 to configure one or more compute nodes 140 to report data, metrics, summary information, or other information. Such data may be reported periodically, when a threshold is met, when an event occurs, on demand, or in another way or on another schedule. Collection module 284 may store some or all of such data within data store 289, and/or may output such data to analysis module 285 for evaluation.

Analysis module 285 may perform functions relating to analyzing how one or more workloads 230 are executing within data center 108 and may assess and/or determine ways in which workloads 230 might execute more efficiently. To perform such analyses, analysis module 285 may evaluate data collected by collection module 284 and determine which of workloads 230 might benefit from additional computing resources and which of workloads 230 are relatively idle (and have an over-allocation of computing resources). Analysis module 285 may make such an assessment based on user input (e.g., in response to input received from administrator device 171). Analysis module 285 may also make such an assessment based on an artificially intelligent or machine learning model trained to evaluate workloads 130 executing in data center 108 specifically (or in a similar data center) and determine a strategy for reallocating resources (e.g., compute servers 150) among various compute nodes 140 and workloads 130. Such an analysis may take into account the thermal profile of compute nodes 140 or specific components of compute nodes 140 (e.g., processor(s) 153). Data collection to support such an implementation may use guest agents executing on compute nodes 140 or within a workload, or data could be collected in another way. In some examples, analysis module 285 may present information about such a proposed reallocation strategy to an administrator by outputting information about the strategy to administrator device 171 and prompt a user of administrator device 171 to approve, modify, or cancel the proposed strategy. In another examples, analysis module 285 might execute a strategy for reallocating resources within data center 108 without first obtaining approval from an administrator. In some examples, time-sharing or scheduling heuristics may be employed to perform rebalancing and/or reallocation. For example, organizations that perform overnight batch processing of workloads can use resources that may be idle during the night.

Analysis module 285 may define an environment as the set of resources needed to run a particular application workload. An environment may be organized into sets of homogenous server instances, each set composed to support a specific sub-function of the application workload. The specification defining each such sub-function may be called a composition profile. For example, in a workload like Splunk, there generally are two types of servers, each with a different resource profile, supporting two distinct sub-functions: search heads and indexer nodes. Analysis module 285 may determine that an environment for a Splunk workload has two composition profiles describing the specifications for those two sub-functions. A composition profile may define the compute profile, the NIC and disk geometry of the server, additional devices such as GPUs and FPGAs, and the number of server instances needed for that sub-function.

For example, in the Splunk example, the composition profile for search heads could specify that the servers each have the following specifications:
  Compute: CPU=24 cores; Memory=128 GB; Model=Dell R640.
  GPU: 2 cores.
  Storage: Boot disk=20 GB; Data disk=6 TB; Cache disk=2 TB.
  Network: NIC 1 on network "DevOps"
  Number of instances: 8.

The composition profile for indexer nodes could have different specifications:
  Compute: CPU=16 cores; Memory=64 GB
  Storage: Boot disk=20 GB; Data disk=4 TB
  Network: NIC 1 on network "DevOps"
  Number of instances: 4

Composition is the process by which analysis module 285 and/or controller 270 builds a server to the specification defined by the composition profile, within the constraints imposed by the resources available in a pool of resources. At times, there may be high-utilization compute nodes 140 or "hot spots" handling workloads 230, (e.g., some environments need additional server resources of one geometry and others have an excess of server resources of a different storage and network geometry). To handle such imbalances, analysis module 285 of controller 270 may, based on input received from administrator device 171, or a predefined set of heuristics, or artificial intelligence/machine learning decision making, choose to temporarily remove the physical server attached to an environment while preserving its entire state (disks, NIC IP address, MAC address, etc.) and move that server to another environment that needs additional compute capacity. The state can later be re-hydrated by attaching the same or a different server that meets the corresponding compute specification. This capability may allow administrators to improve scale-out responsiveness with stateful applications and improve overall data center utilization. This capability may also enable data center operators to dynamically adjust the set of resources allocated to each environment.

In some examples, analysis module 285 may store a gold-master configuration of a workload's environment to be templatized and stored within data store 289 or published in an application marketplace. Such templates may enable fast one-click deployment of applications. In some examples, controller 270 may offer two types of application marketplaces: one accessible by the entire data center and one for each tenant (called "logical partition" in this disclosure) of the data center. The data center administrator might host and grant permissions to specific templates for use in one or more logical partitions. Logical partition administrators can use either templates permissioned to them by the data center administrator or create their own templates. The latter might be visible and accessible to members of that logical partition alone. Logical partition administrators may create environments from scratch or instantiate from existing environment templates. In either case, administrators can deploy environments and could use industry-leading orchestration technologies like Ansible and Terraform. In some examples, first boot configuration is managed via Cloud-init.

Data store 289 may represent any suitable data structure or storage medium for storing information related to utilization, performance, metrics, or other information collected from compute nodes 140. The information stored in data store 289 may be searchable and/or categorized such that one or more modules within controller 270 may provide an input requesting information from data store 289, and in response to the input, receive information stored within data store 289. Data store 289 may be primarily maintained by collection module 284. Data store 289 may provide other modules with access to the data stored within data store 289, and/or may analyze the data stored within data store 289 and output such information on behalf of other modules of controller 270.

Other capabilities of controller 270 may be performed by provisioning module 282, collection module 284, analysis module 285, and/or by other modules of controller 270 not specifically illustrated in FIG. 2. For example, controller 270 may perform infrastructure discovery, registration, and initialization, providing a data center administrator (e.g., an operator of administrator device 171) with the capability to "discover," review, register, and inventory all physical hardware connected to all TOR switches across data center 208. As part of this process, the data center administrator can review physical metadata of hardware, automatically identified during the discovery process, and, optionally, provide additional metadata in the form of key-value pairs to describe those assets. The key-value tags may be assigned and scoped at an individual object level or at an aggregate object type level. Such tags may be of various types, including automatic metadata types and/or custom metadata types. Automatic metadata tags may be information keys automatically generated by controller 270 and are not modifiable. For example, for compute servers, metadata such as manufacturer name, model number, processor family, number of sockets, cores, and amount of memory may fall under this category. Custom metadata tags are information keys and values created and managed by data center administrators to describe business and administrative concerns. For example, for compute servers, a key-value pair called "Cost center" and "Engineering department" could be added to assets for internal bookkeeping. In such an example, once all hardware assets are initialized, resources are ready for use. The capacity across all storage arrays in the deployment may be aggregated into a liquid pool. This storage aggregation generally happens at a low layer.

Controller 270 may also perform role-based access control. In some examples, controller 270 may administer two roles: the data center administrator (DCA) and logical partition (tenant) administrator (LPA). The data center administrator is responsible for managing the infrastructure resources and their allocations to self-sufficient tenants. This role is also responsible for assigning logical partition administrators to manage membership of each tenant. The logical partition administrator is responsible for the resources allocated to a particular tenant. A logical partition administrator can have management privileges to multiple such tenants. Logical partitions may form the basis of the multi-tenancy capabilities of controller 270.

Controller 270 may provide administrators with the capability to partition their resources to multiple tenants. Once resources are allocated to these tenants, each called a Logical Partition, tenants may be empowered to be self-sufficient through self service via independent management portals and APIs. Controller 270 provides the data center administrator role with the capability to partition server, storage, GPU, and networking resources into Logical Partitions. In some examples, servers (and GPUs) are hard partitioned, which may mean that a single server can be assigned, in whole, to one and only one tenant. Infrastructure definitions and metadata are used as criteria to filter, select, and allocate these servers. Storage resources are allocated from liquid pools. Storage capacity and QoS limits are allocated to Logical Partitions enabling tenants to compose disks of arbitrary sizes as long as their aggregate utilization is within those allocations.

In some examples, network resources may be allocated to logical partitions in one or more ways. For example, data center-created networks can be permissioned for use by one or more logical partitions. These networks can be used by those logical partitions but generally cannot be modified. Data center administrators can permission one or more logical partitions to be able to deploy application workloads using so-called Passthrough Networking mode where underlay networks are made available to workloads. This mode allows the data center operator to bypass communication unit 275 and supply their own network controller. Data center administrators can delegate the creation of networks by assigning whole VRF/CIDR blocks to logical partitions. In some cases, one VRF/CIDR block can be assigned to one and only one logical partition. Once resources are allocated, infrastructure administrators are provided aggregated utilization metrics of a logical partition but not how resources are being used inside one. Logical partitions with server, storage, and networking resources can then deploy application workloads.

Controller 270 may also provide a full set of networking capabilities to manage data center 208 via communication unit 275. In such an example, communication unit 275 operates in conjunction with data center Virtual Routing & Forwarding (VRFs). Data center administrators may have the flexibility to create virtual networks and permission them to specific logical partitions, or to delegate the capability to create virtual networks from assigned VRF/CIDR blocks. Controller 270 may support integrating with customers' existing networking infrastructure via BGP-EVPN. For example, customers can use the networking stack included within controller 270 with their BGP-EVPN enabled software NFV systems or existing BGP-EVPN hardware accelerated network devices such as load balancers and firewalls. Controller 270 may provide a built-in default gateway for virtual networks, or customers can use their own BGP-EVPN based devices as gateways. In some examples, communication unit 275 might be bypassed and customers can use their existing network controller without loss of other functionality of controller 270. In such an example, the underlay networks of a deployment are managed by controller 270 and everything else might be managed by the customer's existing network controller. Such a "pass-through" network is physical and might not be managed by controller 270, but it may offer hooks to higher-layer network management systems such as the OVN hierarchy where their configuration and management is handled. Controller 270 may maintain the names and membership of NICs that are in passthrough mode, which is then used by OVS or a similar system to setup one or more virtual overlay networks.

Controller 270 may also provide identity management services. In some examples, controller 270 may leverage KeyCloak to provide robust identity management capabilities, including support for role-based access control and multi-tenancy. Controller 270 may also be configured to work with customer's identity management solutions such as LDAP or Active Directory to authenticate both the data center administrator role and a logical partition administrator role. Optionally, each logical partition's management portal can be configured to work with that tenant organization's own identity provider.

Controller 270 may also provide hardware lifecycle management and monitoring capabilities. For example, a data center administrator (e.g., an operator of administrator device 171) may update versions of the software executing on controller 270 (e.g., modules 282, 284, and 285) and the various other components, including firmware for underlying hardware (e.g. modules on DPU 157, physical server 150). The health status, telemetry data, failure data, and other exception issues of all hardware assets in the data center may be aggregated and monitored by controller 270. Critical events may be pushed to users (e.g., an operator of administrator device 171) in the form of notifications. Administrators can customize the volume and the type of notifications they would like to receive. Notifications may be published to standard industry formats, pushed through the management portal, and sent via email. The scope of monitoring and notification coverage is limited to the permission level of each role. A dashboard with aggregate hardware status may be offered to provide situational awareness. This dashboard may also include a list of critical items that need immediate attention. A detailed log of all system events may be maintained and published using industry standard log management technologies.

Modules illustrated in FIG. 2 (e.g., provisioning module 282, collection module 284, and analysis module 285) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
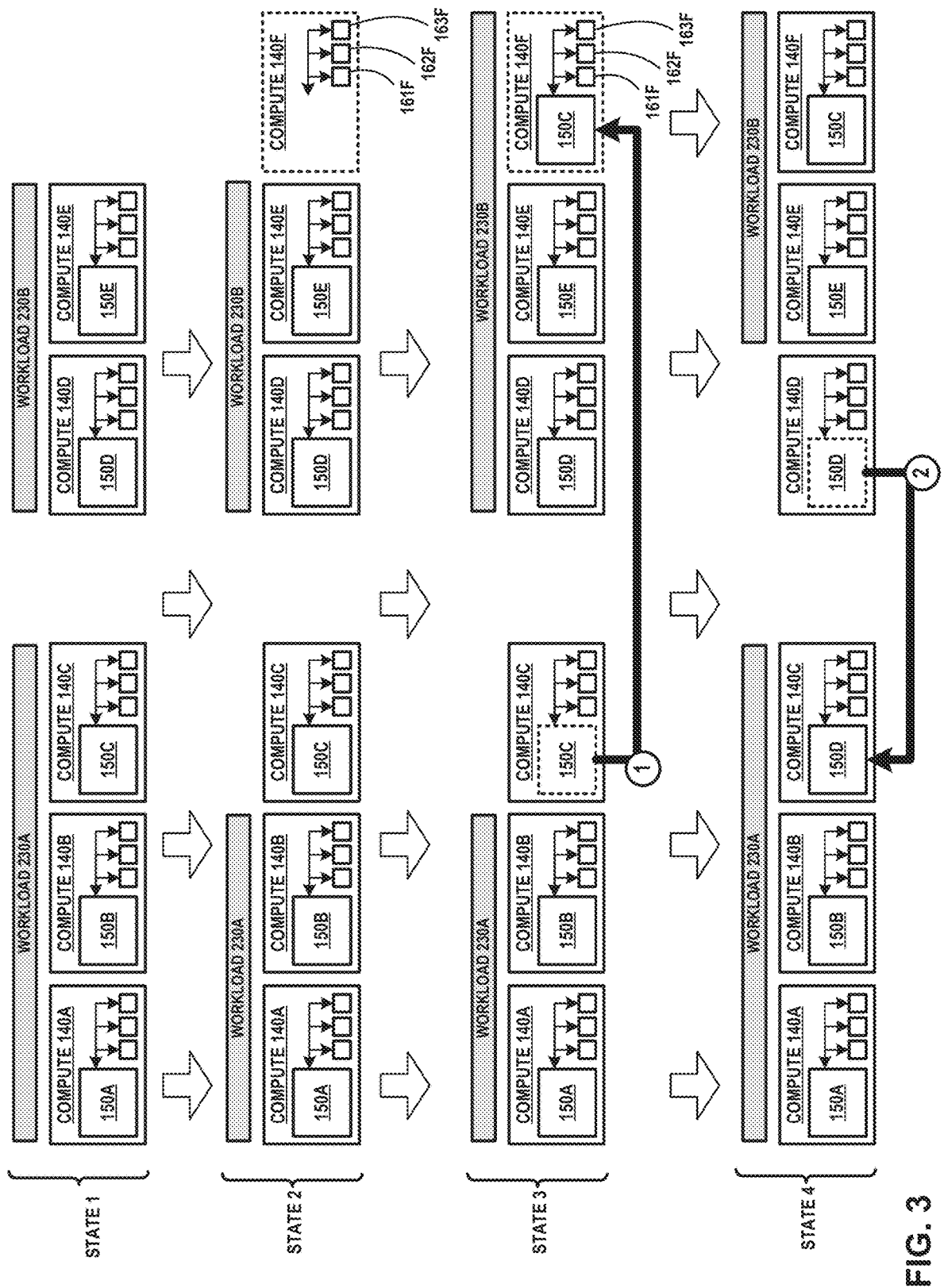
FIG. 3 is a conceptual diagram illustrating an example process for adjusting computing resources allocated to workloads, in accordance with one or more aspects of the present disclosure.

FIG. 3 is a conceptual diagram illustrating an example process for adjusting computing resources allocated to workloads, in accordance with one or more aspects of the present disclosure. FIG. 3 illustrates changes to how workloads 230A and 230B may be executed across compute nodes 140. Workloads 230A and 230B executing on various compute nodes 140, as shown in FIG. 3, may correspond to workloads 230A and 230B executing across compute nodes 140 of FIG. 2. Accordingly, FIG. 3 is described herein within the context of FIG. 2.

As shown in FIG. 3, in an initial state ("state 1"), a representation of workload 230A is illustrated above compute nodes 140A, 140B, and 140C, indicating that workload 230A is executing on compute nodes 140A through 140C. Similarly, a representation of workload 230B is shown above compute node 140D and compute node 140E, indicating that workload 230B executes on compute nodes 140D and 140E. The initial state ("state 1") shown at the top of FIG. 3 corresponds to the state of workloads 230 and compute nodes 140 illustrated in FIG. 2. Later stages illustrated in FIG. 3, indicated by "state 2," "state 3," and "state 4" show changes to how workloads 230A and 230B might be processed by compute nodes 140, particularly as demands of workloads 230A and 230B change.

In the example of FIG. 2, and in accordance with one or more aspects of the present disclosure, controller 270 may deploy workloads 230A and workload 230B within data center 108. For instance, in an example that can be described with reference to FIG. 2 and FIG. 3, communication unit 275 of controller 270 detects a signal from administrator device 171. Communication unit 275 outputs information about the signal to provisioning module 282. Provisioning module 282 determines that the signal corresponds to one or more composition profiles 182. Based on such composition profiles 182, provisioning module 282 causes controller 270 to create compute nodes 140A through 140E within data center 208. Provisioning module 282 causes controller 270 to deploy workload 230A across a first cluster of compute nodes 140 (i.e., compute nodes 140A through 140C). Provisioning module 282 causes controller 270 to deploy workload 230B across a second cluster of compute nodes 140 (i.e., compute nodes 140D and 140E). Accordingly, based on composition profiles 182 and/or other directives, workloads 230A and 230B execute across compute nodes 140 as shown in "state 1" of FIG. 3.

Controller 270 may configure one or more of compute nodes 140 to collect data about performance, utilization, and/or metrics associated with compute nodes 140. For instance, continuing with the example being described with reference to FIG. 2 and FIG. 3, collection module 284 of controller 270 causes communication unit 275 to output a signal over switch fabric 105. Each of compute nodes 140 detect a signal and determine that the signal corresponds to a request for utilization information, performance information, and/or operational metrics associated with the operations performed by each of compute nodes 140. Each of compute nodes 140 respond to the signal from controller 270 by collecting and/or continuing to collect information about operational performance. In some examples, an agent executing on compute nodes 140 (and/or within workloads 230) may collect relevant data and respond to the signal.

Each of compute nodes 140 may report data about performance, utilization, and/or metrics. For instance, still continuing with the example being described, each of compute nodes 140 output signals over switch fabric 105, responsive to the request signals from controller 270. Communication unit 275 of controller 270 detects a set of signals and outputs information about the signals to collection module 284. Collection module 284 determines that the signals include information about utilization, performance, and/or metrics for each of compute nodes 140. In some examples, each of compute nodes 140 may report such information to controller 270 periodically. In other examples, one or more of compute nodes 140 might report such information on a different schedule, or when a threshold is met, when an event occurs, on demand, or in another way.

Controller 270 may determine that compute resources should be reallocated among workloads 230. For instance, again with reference to FIG. 2 and FIG. 3, communication unit 275 of controller 270 collects signals over switch fabric 105 from compute nodes 140. Communication unit 275 outputs information about the signals to collection module 284. Collection module 284 determines that the signals correspond to metrics and other information about the execution of workloads 230 across compute nodes 140. Collection module 284 outputs information about the metrics and related information to analysis module 285. Analysis module 285 determines, based on the metrics and related information, that each of compute nodes 140D and 140E are experiencing relatively high CPU utilization while executing workload 230B. Analysis module 285 also determines that compute nodes 140A through 140C are experiencing relatively low CPU utilization while executing workload 230A. Analysis module 285 further determines that workload 230B would operate more effectively, efficiently, and/or expeditiously if more compute resources were allocated to workload 230B.

Controller 270 may idle one or more of compute nodes 140 that support workload 230A. For instance, still with reference to the example being described, analysis module 285 causes communication unit 275 to output a signal over switch fabric 105. DPU 157C of compute node 140C detects a signal over switch fabric 105. DPU 157C determines that the signal represents a command to wind down that portion of workload 230A that is being performed by compute node 140C. DPU 157C terminates the portion of workload 230A that is being executed at compute server 150C of compute node 140C, thereby idling compute node 140C. DPU 157 thus "dehydrates" the idle workload executing on compute server 150C. Workload 230A continues to be processed within data center 208, but now only by compute nodes 140A and 140B. Accordingly, the cluster of compute nodes 140 that support workload 230A has been reduced by one. See "state 2" in FIG. 3. In some examples, this process may involve DPU 157 issuing a safe shutdown command (or unsafe shutdown command if a safe shutdown command is not available). In response, compute node 140C shuts down. Workload 230A may see one of its nodes go down and in response, initiate a cluster recovery protocol. Such a cluster recovery protocol might, in some examples, involve moving data around to satisfy the data redundancy requirements of that workload 230A given a reduction in the number of members. In many cases, however, it is not optimal to perform such data movement each time the cluster size is rebalanced.

Therefore, in some examples, and particularly where an agent executes in the workload 230A, controller 270 instructs the agent to safely and temporarily shut down compute node 140C. In response, workload 230A issues a shutdown command and node 140C is idled. This process may avoid initiation of a sub-optimal cluster recover protocol, since the shutdown is "temporary."

Controller 270 may provision one or more additional compute nodes 140 to support workload 230B. For instance, referring still to the example being described with reference to FIG. 2 and FIG. 3, analysis module 285 outputs information to provisioning module 282. Provisioning module 282 determines that the information corresponds to a command to provision a new compute node 140 to support workload 230B. Provisioning module 282 causes controller 270 to compose compute node 140F with specifications appropriate for executing workload 230B. Provisioning module 282 causes controller 270 to initialize storage device 161F, NIC 162F, and GPU 163F so that each of such peripheral devices 160 are appropriately initialized for execution of workload 230B. Provisioning module 282 outputs information to analysis module 285, indicating that compute node 140F has been provisioned. Although compute node 140F has been provisioned and includes various peripheral devices 160 that might be initialized for use in processing workload 230B, compute node 140F still lacks a physical compute server (or bare metal server) for performing processing at compute node 140F. See compute node 140F illustrated in "state 2" of FIG. 3.

Note that in state 2 of FIG. 3, compute node 140C is shown as not necessarily supporting workload 230A (i.e., workload 230A is not "above" compute node 140C). While in some examples, this may suggest that compute node 140C was ejected from the workload, in other examples intended to be encompassed by FIG. 3, the compute node 140C might not necessarily be ejected from the workload 230A. Such an ejection may trigger a cluster recovery protocol and/or significant data movement, which, as described above, might not always be optimal. If, however, node 140C is temporarily shut down (and not "ejected," at least from the perspective of workload 230A), such recovery protocols and/or data movement may be avoided. Accordingly, while in state 2 of FIG. 3 workload 230A is illustrated as not being above compute node 140C, FIG. 3 is intended to also encompass examples where compute node 140C is still part of the workload, and is only temporarily shut down, such as to ensure that sub-optimal data movement processes and/or other protocols are avoided. Controller 270 may detach compute server 150C from compute node 140C and redeploy compute server 150C to compute node 140F. For instance, referring again to the example being described in the context of FIG. 2 and FIG. 3, analysis module 285 causes communication unit 275 of controller 270 to output a signal over switch fabric 105. DPU 157C of compute node 140C detects a signal and determines that the signal corresponds to a command to detach compute server 150C from compute node instance 140C and redeploy compute server 150C to compute node instance 140F. DPU 157C detaches compute server 150C from compute node 140C, leaving an idle and/or unused (i.e., "dehydrated") compute node 140C. Compute node 140C has been previously provisioned and still exists as a composed compute node, but after detachment of compute server 150C, compute node 140C no longer uses compute server 150C to process workloads. Controller 270 and/or DPU 157C attach compute server 150C to compute node 140F (see bold arrow "1" in FIG. 3). Compute node 140F thereafter executes workloads 230B, along with compute nodes 140D and 140E. Accordingly, at this point, workload 230A executes on compute nodes 140A and 140B, and workload 230B executes on compute nodes 140D, 140E and 140F ("state 3" in FIG. 3).

Note also that a "warm standby" option may be employed to make attaching compute servers 150 (e.g., attaching compute server 150C to compute node 140F, as described above) more efficient and/or quicker. Warm standby involves booting a bare metal server so its BIOS is partly loaded but is held just at the point for seeking a boot device. The DPU (e.g., DPU 157C) keeps the server in that state until a time when it knows which compute node that server should be attached to. This process enables the movement of servers among nodes to be quicker and/or more efficient. Without this warm standby process, moving a compute node 150 from one compute node 140 to another may otherwise require a significant amount of time (e.g., on the order of a couple of minutes) for the compute node 150 to start from cold and for the BIOS to fully load.

Controller 270 may determine that compute resources should again be reallocated among workloads 230. For instance, referring again to FIG. 2 and FIG. 3, collection module 284 of controller 270 continues to monitor metrics associated with the execution of workloads 230 across compute nodes 140. Collection module 284 continues to output information about the metrics and related information to analysis module 285. Analysis module 285 eventually determines after a period of time, and based on the metrics and related information, that utilization rates across compute nodes 140 have changed. Specifically, analysis module 285 determines that compute nodes 140A and 140B are experiencing high CPU utilization rates while executing workload 230A. Analysis module 285 further determines that the compute nodes 140 processing workload 230B (i.e., compute nodes 140D, 140E, and 140F) are experiencing relatively low CPU utilization rates. Analysis module 285 concludes that processing resources should be reallocated from workload 230B to workload 230A.

Controller 270 may scale down the cluster of compute nodes 140 that support workload 230B. For instance, continuing with the example being described, analysis module 285 causes communication unit 275 of controller 270 to output a signal over switch fabric 105. DPU 157D of compute node 140D receives the signal determines that the signal includes a command to wind down execution of workload 230B at compute node 140D. DPU 157D terminates execution of workloads 230B at compute node 140D, and "dehydrates" the idle workload executing on compute node 140D. Dehydrating compute node 140D reduces by one the cluster of compute nodes 140 supporting workload 230B. Compute nodes 140E and 140F continue to process workload 230B after compute node 140D has been idled. See "state 4" of FIG. 3.

Controller 270 may reallocate compute server 150D to support workload 230A. For instance, still with reference to FIG. 2 and FIG. 3, DPU 157D detaches compute server 150D from compute node 140D, leaving dehydrated compute node 140D without compute server 150D. Controller 270 and/or DPU 157C rehydrate compute node 140C with compute server 150D (bold arrow "2" in FIG. 3). In the example being described, no additional compute node 140 needs to be provisioned by controller 270, since the previously dehydrated compute node instance 140C (see "state 3") is still available, and can be "rehydrated" by attaching compute server 150D. Compute node 140C may still have data and state information available from its prior state, thereby easing the process of prepping compute node 140C to again support workload 230A. Compute node 140C thereafter executes workload 230A along with compute nodes 140A and 140B. See "state 4" of FIG. 3.

In the example illustrated in FIG. 3, controller 270 might have chosen, in state 4, to return compute server 150C back to compute node 140C, rather than winding down compute node 140D and deploying compute server 150D to compute node 140C. However, in at least some examples, it may be possible to deploy any of compute servers 150 across any of compute nodes 140. Accordingly, the example of FIG. 3 illustrates that it is not necessary to return compute server 150C to compute node 140C. In some examples, various compute servers 150, free and unattached to any workloads, or attached and supporting workloads, can be deployed and redeployed across any compute nodes 140 within data center 208 in any way that efficiency and performance considerations might indicate.

Figure 4:
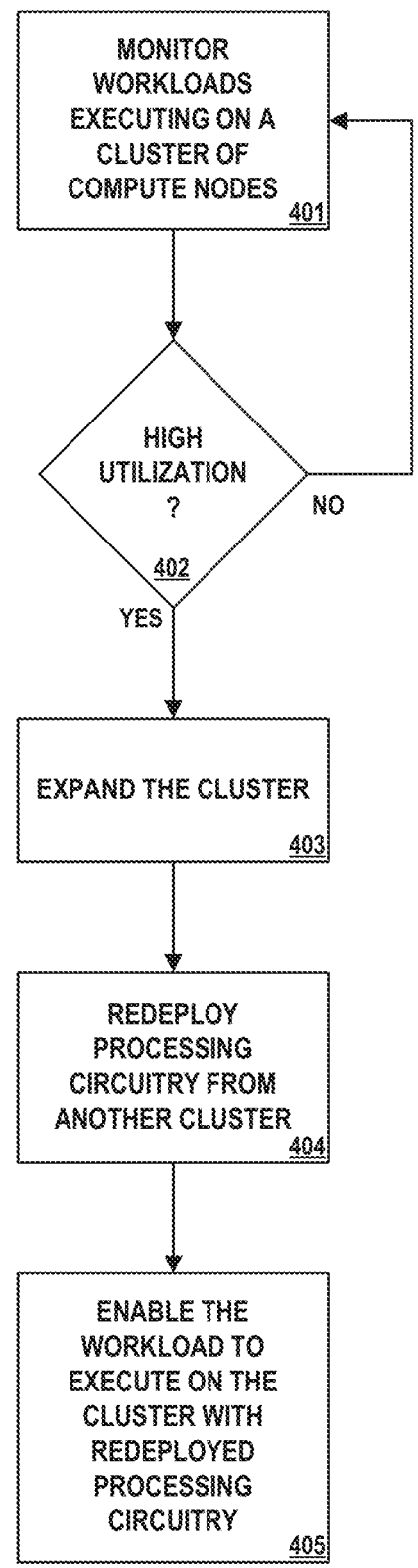
FIG. 4 is a flow diagram illustrating operations performed by an example composer or controller in accordance with one or more aspects of the present disclosure.

FIG. 4 is a flow diagram illustrating operations performed by an example composer or controller in accordance with one or more aspects of the present disclosure. FIG. 4 is described below within the context of controller 170 of FIG. 1A. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, controller 170 may monitor workloads executing on a cluster of compute nodes (401). For example, with reference to FIG. 1A, controller 170 monitors, queries, or otherwise receives information about utilization, performance, and/or other metrics associated with various workloads 130 executing within data center 108. Controller 170 may collect or receive information about workloads 130 periodically, occasionally, on demand, when an event occurs, or when a threshold is met, or otherwise.

Controller 170 may determine whether one or more clusters of nodes is experiencing high utilization (402). For example, controller 170 may receive information about processor utilization of workload 130B, and determine the utilization of the processors associated with both compute nodes 140C and 140D. In examples where compute nodes 140C and 140D are not highly-utilized, controller 170 continues to monitor workloads executing on the cluster (NO path from 402). However, in the example being described, controller 170 determines that the processors associated with both compute nodes 140C and 140D are highly utilized (YES path from 402).

Controller 170 may expand a cluster of computing nodes (403). For example, controller 170 increases the size of the cluster of compute nodes 140 that are processing workload 130B. Controller 170 composes new compute node 140E and prepares it for processing workload 130B. By composing compute node 140E, controller 170 is expanding the cluster of compute nodes 140 that process workload 130B to three compute nodes.

Controller 170 may redeploy processing circuitry from a pool of free physical servers or another cluster (404). For example, controller 170 determines that the processors associated with compute nodes 140A and 140B (processing workload 130A) are not highly utilized. Controller 170 winds down compute node 140B. Controller 170 detaches compute server 150B but preserves the state of compute node instance 140B, thereby enabling compute node 140B to later be restarted, if needed. Controller 170 attaches compute server 150B to compute node 140E, thereby redeploying compute server 150B into compute node 140E and hydrating newly composed compute node instance 140E.

Controller 170 may enable the workload to execute on the cluster with the redeployed processing circuitry (405). For example, once more with reference to FIG. 1A, controller 170 causes workload 130B to execute across compute nodes 140C, 140D, and 140E. Compute node 140E executes workload 130B by using the redeployed compute server 150B from compute node 140B. Workload 130A may thereafter continue to be processed within data center 108, but in the example of FIG. 1A, workload 130A thereafter executes only on compute node 140A.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The illustrations included herein each depict at least one example implementation of an aspect of this disclosure. The scope of this disclosure is not, however, limited to such implementations. Accordingly, other example or alternative implementations of systems, methods or techniques described herein, beyond those illustrated, may be appropriate in other instances. Such implementations may include a subset of the devices and/or components included in the illustrations and/or may include additional devices and/or components not shown in the illustrations.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    monitoring, by a computing system, a first workload executing on a first cluster of compute nodes that includes a first compute node, wherein the first compute node includes processing circuitry and first node secondary storage;
    monitoring, by the computing system, a second workload executing on a second cluster of compute nodes;
    expanding, by the computing system, the second cluster of compute nodes to include a second compute node that includes second node secondary storage;
    redeploying the processing circuitry included within the first compute node to the second compute node; and
    enabling, by the computing system, the second workload to continue executing on the second cluster of compute nodes including the second compute node, and wherein the second compute node processes at least a portion of the second workload using the processing circuitry and the second node secondary storage.

2. The method of claim 1, wherein the processing circuitry is a bare metal server having a processor and memory.

3. The method of claim 2, wherein the processing circuitry does not include any secondary storage devices or network interface devices or GPUs or FPGAs or other PCIe devices.

4. The method of claim 1, wherein expanding the second cluster includes initializing the second node secondary storage and network interface devices with information about the second workload.

5. The method of claim 1, wherein redeploying the processing circuitry includes:
    winding down execution of the first workload on the first compute node;
    enabling the first workload to continue executing on the first cluster of compute nodes without the first compute node;
    detaching the processing circuitry from the first compute node; and
    attaching the processing circuitry to the second compute node.

6. The method of claim 5, wherein detaching the processing circuitry includes:
    detaching a processor and memory from the first compute node, while retaining within the first node state information associated with processing of the first workload.

7. The method of claim 1, wherein expanding the second cluster of compute nodes includes:
    determining, based on monitoring the second workload, that the second cluster of compute nodes is experiencing a relatively high CPU utilization; and
    determining, based on administrator input or other heuristics, that the second cluster of compute nodes needs additional CPU and memory resources.

8. The method of claim 1, wherein redeploying the processing circuitry includes:
    determining, based on monitoring the first workload, that the first cluster of compute nodes is experiencing a relatively low CPU utilization; and
    determining, based on administrator input or other heuristics, that the second cluster of compute nodes can function with reduced CPU and memory resources.

9. The method of claim 1, further comprising:
    monitoring, by the computing system, a third workload executing on a third cluster of compute nodes that includes a third compute node;
    winding down execution of the third workload on the third compute node;
    enabling the third workload to continue executing on the third cluster of compute nodes without the third compute node;
    detaching third node processing circuitry from the third compute node;
    recomposing the first compute node by attaching the third node processing circuitry to the first compute node; and enabling the first compute node to execute at least a portion of the first workload using the third node processing circuitry and the first node secondary storage.

10. A computing system connected to a network and configured to:
monitor, over the network, a first workload executing on a first cluster of compute nodes that includes a first compute node, wherein the first compute node includes processing circuitry and first node secondary storage;
monitor, over the network, a second workload executing on a second cluster of compute nodes;
expand the second cluster of compute nodes to include a second compute node that includes second node secondary storage;
redeploy the processing circuitry included within the first compute node to the second compute node; and
enable the second workload to continue executing on the second cluster of compute nodes including the second compute node, and wherein the second compute node processes at least a portion of the second workload using the processing circuitry and the second node secondary storage.

11. The system of claim 10, wherein the processing circuitry is a bare metal server having a DPU with processor and memory.

12. The system of claim 11, wherein the processing circuitry does not include any secondary storage devices or network interface devices or GPUs or FPGAs or other PCIe devices.

13. The system of claim 10, wherein expanding the second cluster includes initializing the second node secondary storage and network interface devices with information about the second workload.

14. The system of claim 10, wherein redeploying the processing circuitry includes:
winding down execution of the first workload on the first compute node;
enabling the first workload to continue executing on the first cluster of compute nodes without the first compute node;
detaching the processing circuitry from the first compute node; and
attaching the processing circuitry to the second compute node.

15. The system of claim 14, wherein detaching the processing circuitry includes:
detaching a processor and memory from the first compute node, while retaining within the first node state information associated with processing of the first workload.

16. The system of claim 10, wherein expanding the second cluster of compute nodes includes:
determining, based on monitoring the second workload, that the second cluster of compute nodes is experiencing a relatively high CPU utilization.

17. The system of claim 10, wherein expanding the second cluster of compute nodes includes:
determining, based on administrator input or other heuristics, that the second cluster of compute nodes needs additional CPU and memory resources.

18. The system of claim 10, wherein redeploying the processing circuitry includes:
determining, based on monitoring the first workload, that the first cluster of compute nodes is experiencing a relatively low CPU utilization.

19. The system of claim 10, wherein redeploying the processing circuitry includes:
determining, based on administrator input or other heuristics, that the first cluster of compute nodes can function with reduced CPU and memory resources.

20. The system of claim 10, wherein the computing system is further configured to:
monitor a third workload executing on a third cluster of compute nodes that includes a third compute node;
wind down execution of the third workload on the third compute node;
enable the third workload to continue executing on the third cluster of compute nodes without the third compute node;
detach third node processing circuitry from the third compute node;
recompose the first compute node by attaching the third node processing circuitry to the first compute node; and
enable the first compute node to execute at least a portion of the first workload using the third node processing circuitry and the first node secondary storage.

* * * * *